United States Patent
Rapp et al.

(10) Patent No.: US 8,493,652 B2
(45) Date of Patent: Jul. 23, 2013

(54) METHOD FOR CONTROLLING AN ERBIUM DOPED FIBER AMPLIFIER (EDFA) AND AMPLIFIER ARRANGEMENT

(75) Inventors: Lutz Rapp, Deisenhofen (DE); Dario Setti, München (DE)

(73) Assignee: Nokia Siemens Networks Oy, Espoo (FI)

( * ) Notice: Subject to any disclaimer, the term of this patent is extended or adjusted under 35 U.S.C. 154(b) by 384 days.

(21) Appl. No.: 12/922,198

(22) PCT Filed: Mar. 11, 2009

(86) PCT No.: PCT/EP2009/052822
§ 371 (c)(1),
(2), (4) Date: Dec. 22, 2010

(87) PCT Pub. No.: WO2009/112504
PCT Pub. Date: Sep. 17, 2009

(65) Prior Publication Data
US 2011/0085230 A1 Apr. 14, 2011

(30) Foreign Application Priority Data
Mar. 13, 2008 (EP) .................................. 08004729

(51) Int. Cl.
*H04B 10/17* (2006.01)
*H04B 10/12* (2006.01)
(52) U.S. Cl.
USPC ............. 359/341.33; 359/341.41; 359/341.42

(58) Field of Classification Search
USPC ........................... 359/341.33, 341.41, 341.42
See application file for complete search history.

(56) References Cited

U.S. PATENT DOCUMENTS

| 5,991,069 A | 11/1999 | Jander |
| 6,377,394 B1 | 4/2002 | Drake et al. |
| 6,384,965 B2 * | 5/2002 | Akiyama .................... 359/341.4 |
| 2001/0008459 A1 * | 7/2001 | Ohshima et al. .......... 359/341.44 |
| 2008/0204860 A1 | 8/2008 | Rapp |
| 2009/0201576 A1 * | 8/2009 | Bolshtyansky et al. .. 359/341.33 |

FOREIGN PATENT DOCUMENTS
EP 0932228 A2 7/1999
WO 2007006679 A1 1/2007

OTHER PUBLICATIONS

Lutz Rapp: "Comparison of EDFA Stages using Pump Power Splitting or Pump Bypass Technique with Respect to Steady-state Performance" Journal of Optical Communications, 2006, XP009104174.

* cited by examiner

*Primary Examiner* — Eric Bolda
(74) *Attorney, Agent, or Firm* — Laurence A. Greenberg; Werner H. Stemer; Ralph E. Locher (57) ABSTRACT

The invention refers to a method for operating an amplifier with a first amplifier stage (A1) and a second amplifier stage (A2), pumped by a single pump light source (11) generating a primary pump signal ($S_{PUMP}$), which is split into first pump signal (S1) and a second pump signal (S2) according to a variable splitting factor ($\alpha$) for pumping the first amplifier stage (A1) and the second amplifier stage (A2) respectively. The splitting factor ($\alpha$) is varied to achieve an optimized noise figure.

12 Claims, 7 Drawing Sheets

METHOD FOR CONTROLLING AN ERBIUM DOPED FIBER AMPLIFIER (EDFA) AND AMPLIFIER ARRANGEMENT

FIELD OF THE INVENTION

The invention refers to a Method for controlling an erbium doped fibre amplifier and an amplifier arrangement.

BACKGROUND OF THE INVENTION

Erbium Doped Fibre Amplifiers (EDFAs) are widely deployed in optical Dense Wavelength Division Multiplexing (DWDM) transmission systems due to their capability to amplify all DWDM signal simultaneously in an almost satisfying manner. Furthermore, EDFAs represent key components for the integration of point-to-point links in optical networks. This trend results in an increased number of amplifiers used in an optical network due to the additional losses introduced by switches, multiplexers etc. Furthermore, optical networking technology has become attractive for regional and metropolitan networks with stringent cost requirements.

Therefore, reducing amplifier cost without sacrificing functionality is a key requirement for EDFAs. The core of the amplifier is given by the gain medium, i.e. the "Erbium Doped Fibre", that provides the amplification, and by the laser pumps, that provide the power to allow that a sufficient part of the dopant ions in the Erbium Doped Fibre (EDF) leave the ground state to reach the desired excited state level. Practical implementations of EDFAs deploy additional passive components such as tap couplers/splitters, signal monitors, WDM couplers to couple the pump radiation and the signal light into the EDF, isolators, etc, too. However, from a costs perspective, pump lasers represent the driving element. As a consequence, the number of pumps must be kept as low as possible to significantly reduce EDFA costs.

In order to reduce cost of an EDFA, it has been proposed that two or more EDF coils are pumped by the same laser, making use of a fused splitter characterized by a fixed splitting ratio so that the portions of the light entering each EDFA stage cannot be set independently.

On the other hand, a four port combiner with unequal branching ratio has been used in a configuration with two pumps in order to compensate for deviations of component characteristics from design values and to improve reliability. Embodiments of this invention are described in U.S. Pat. No. 5,561,552 and EP 588 557 A1.

However, there is a major drawback associated with this technique. In most cases, WDM systems are put into operation with a small number of active channels. Later on, additional channels are added according to the demand of capacity. Therefore, amplifiers and their control algorithm have to be designed to provide suitable performance starting from operation with a single channel to up to the maximum channel load.

The noise figure of setups based on pump slitting that are operated at constant gain is significantly larger at small input power, i.e. small channel count. Thus, the maximum number of spans is limited by the noise performance at small channel count. To reduce this disadvantage, high values of the splitting ratio can be considered. However, to achieve high output power levels (that is the case for high channel load) lower values of the splitting ratio are required (i.e. high pump power in the second EDF coil). As a consequence, high values of the splitting ratio are related to lower output power levels, i.e. the maximum gain provided by the amplifier is reduced. The choice of a fixed splitting ratio is based on a trade-off between these two constraints.

In order to reduce the limitations imposed by a fixed splitting ratio, a configuration is described in a patent application DE 10 2005 031 897 A1. For this setup, the pump power entering the second EDF coil is not a fixed portion of the power provided by the pump, because the attenuation provided by an EDF (acting as a saturated absorber) in the pump line of the second stage decreases by increasing the pump power. However, this solution presents the following drawbacks:

The EDF in the pump path causes absorption of the pump light.

The EDF in the pump path acts as an Amplified Spontaneous Emission (ASE) noise source that might be added (after attenuation by the WDM coupler) to the signal propagating in the optical main path. In addition, backward propagating ASE will propagate in the direction of the pump.

Once the fixed splitting ratio and the length of the EDF in the pump path have been fixed, the pump power impinging the second EDF stage is a function of the power provided by the pump itself. As a consequence, the equivalent splitting ratio of this setup is a function of the pump power, i.e. it is not possible to set the equivalent splitting ratio and the power provided by the pump independently. In other words, this architecture has one degree of freedom. But this sets a limit to the maximum value for the equivalent splitting ratio that is responsible for a suboptimal noise performance.

OBJECTS AND SUMMARY OF THE INVENTION

It is an object of the invention to overcome these problems and to find a method and an apparatus for high quality amplification of optical signals within a wide range of the output power.

A way to improve the signal quality is achieved by a method as claimed.

An optical amplifier improving the signal quality is achieved by a device as claimed.

Additional advantageously features are described in depending claims.

A key difference with respect to the previous solution is the deployment of a tuneable pump splitter in combination with an inventive control method. The advantages of this solution can be listed as follows:

The light travelling in the pump path does not experience absorption.

Due to the absence of an EDF in the pump path, ASE noise is not added to the signal and ASE power does not propagate in the direction of the pump.

The configuration according to the invention offers the advantage of two degrees of freedom during operation, namely the level of the pump power and the splitting ratio. This means that both parameters can be set freely and a fixed relationship given by physical effects does not limit the set of possible couples. That way, the noise figure degradation at low channel count or by operating the amplifier below the maximum output power is significantly reduced by means of a high value of the splitting ratio and of the pump power, whereas a high output power level is achieved by decreasing the splitting ratio.

Due to the absence of the EDF in the pump path, once the insertion loss of the tuneable device is considered, the total pump power provided by the pump is available for achieving the desired amplification.

Actually, the insertion loss of the tuneable splitter as a bulk element is slightly higher than for the fixed splitter. The implementation of the proposed setup by means of discrete components will be affected by this drawback. However, this is avoided as soon as the proposed configuration is implemented as an entity with a Planar Lightwave Circuit (PLC) approach. By adopting this strategy, the tuneable splitter can be integrated on a chip without causing additional losses with respect to the architecture based on the fixed splitting ratio. It is to be pointed out that the PLC approach is attractive because of the reduced mechanical dimensions and reduced manufacturing effort, and the proposed architecture will allow for building compact amplifiers with very good noise performances. In principle, the gain medium could be any kind of material or composant providing light amplification (meaning that only the passive components are integrated on the chip), but a fully integrated approach based on Erbium Doped Waveguides (EDW) represents an alternative choice.

As mentioned above, the advantage of the proposed approach is the fact that the pump power level and the splitting ratio can be set independently, so that at small channel count or at output power levels below the maximum the noise performances are improved by means of a high splitting ratio $\alpha$ (i.e. a large portion of the pump light coupled into the first EDF coil), whereas at high channel count the output power can be increased by setting a lower value for the splitting ratio. Obviously, the presence of two degrees of freedom affects the control strategy. Since the splitting ratio of the tuneable element and the pump power level can be set independently, these quantities can be regarded as the actuating (control) variables for the proposed solution. As a consequence, the control strategy is different. Focusing the attention on the new setup, the control of the amplifier must act on the two variables properly to guarantee best performances. Generally, a certain output gain level can be achieved with different couples of pump power and splitting ratio. However, optimum performance is only obtained with a properly chosen combination of the two parameters.

Nevertheless, a reduction of actuating (control) variables from two to one is desirable to speed-up the control, so that only one variable is to be adjusted as a function of the output power. This is achievable by defining the pump power entering the second EDF stage as the unique actuating variable.

Related to transient events another embodiment of the amplifier will be presented. In order to achieve a fast response of the amplifier to transient events, the control circuits uses a feed-forward part that causes a variation in the (pump power) actuating variable as a consequence of a variation in the input power. A common application of this approach is the operation at constant gain of EDFAs. By adopting the pump power entering the second EDF coil as the actuating variable, a feed-forward component based on approximated mathematical relationships is added.

BRIEF DESCRIPTION OF THE DRAWINGS

The invention will be explained in more detail in conjunction with the appended drawings, wherein.

DESCRIPTION OF PREFERRED EMBODIMENTS

Figure 1:
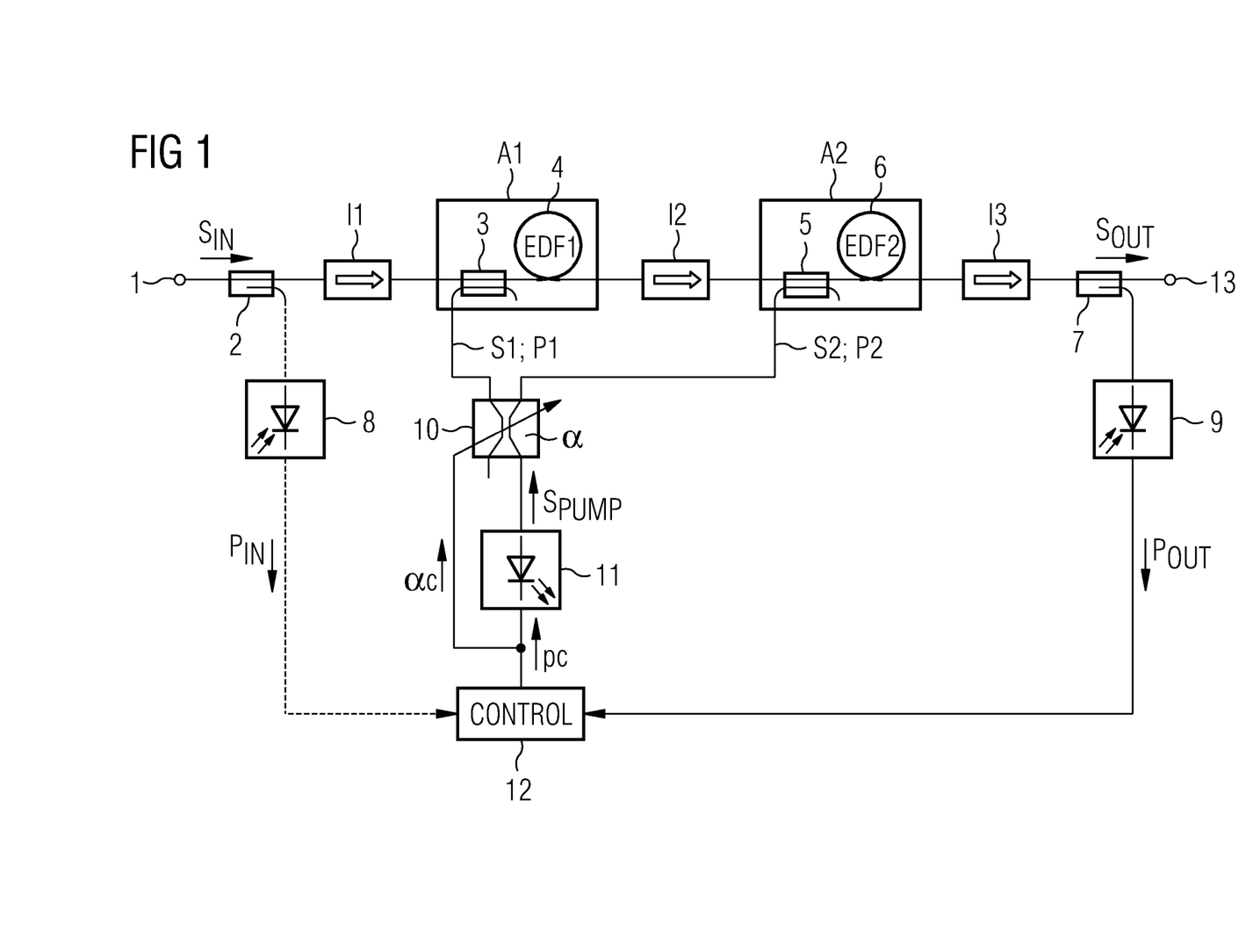
FIG. 1 is a simplified diagram showing a two stage amplifier according to the invention.

The diagram FIG. 1 shows an illustrative arrangement of an optical amplifier embodying the principles of the invention. The optical amplifier has two amplifier stages A1 and A2 comprising erbium doped fibres 4 and 6, labelled EDF1, EDF2.

The first amplifier stage A1 contains a first coupler 3 for inserting a first pump signal S1 into the fibre 4 and the second amplifier stage A2 contains a second coupler 5 for inserting a second pump signal S2 into the fibre 6. A pump light source (laser) 11 generates a primary pump signal $S_{PUMP}$, which is fed to a tuneable splitter 10 dividing the generated pump signal $S_{PUMP}$ into the first pump signal S1 and the second pump signal S2 with a power level of $P1=\alpha \cdot P_{PUMP}$, $P_{PUMP}$ and $P2=(1-\alpha) \cdot P_{PUMP}$ respectively according to a splitting factor $\alpha$.

An input signal $S_{IN}$, in most cases a WDM-signal, is received at an input 1 of the amplifier and passed through a first splitter 2, a first isolator I1, the first amplifier stage A1, a second isolator I2, the second amplifier stage A2, a third isolator I3, and a second coupler 7 before it is output as an amplified output signal $S_{OUT}$ at the output 13. The serial connection may also comprise filters, attenuators and other additional elements.

The output power $P_{OUT}$ or the amplifier gain is controlled by a control unit 12 receiving monitoring signals representing input power $P_{IN}$ and output power $P_{OUT}$ from a first optical-electrical converter 8 and a second optical-electrical converter 9, which are connected to the first and second splitters 2 and 7 respectively.

Figure 4:
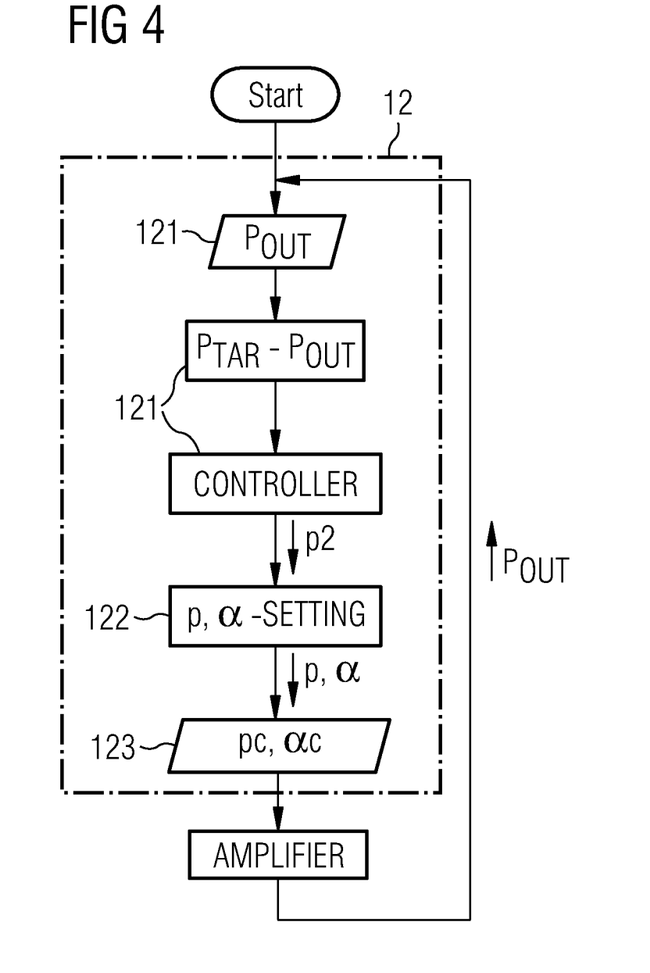
FIG. 4 is a block diagram showing a control method.
Figure 5:
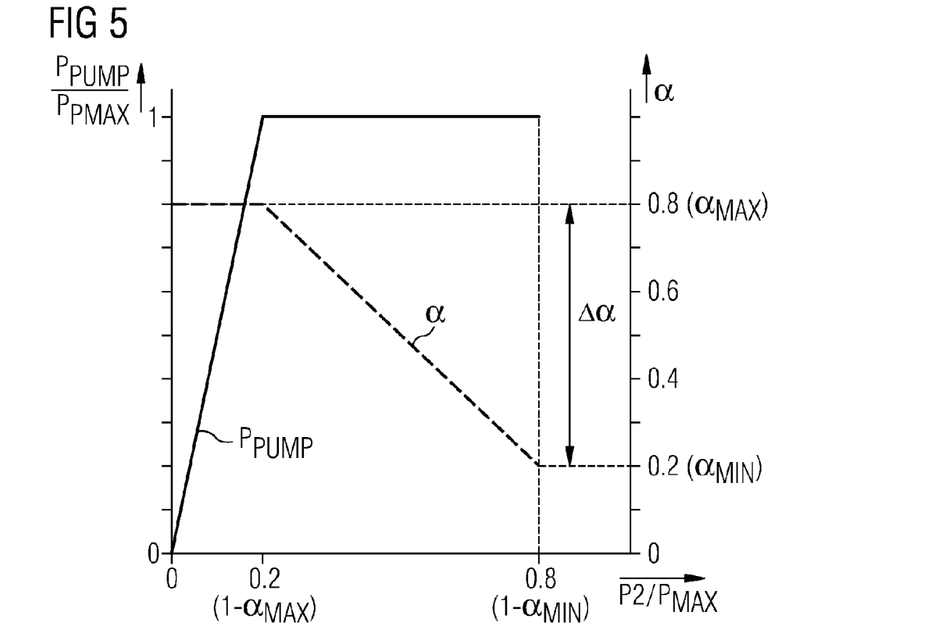
FIG. 5 is a flow diagram showing the splitting factor control.

The control unit 12 outputs control signals pc and $\alpha$c determining the total pump power $P_{PUMP}$ of the primary pump signal $S_{PUMP}$ and the splitting factor $\alpha$ (FIG. 4, FIG. 5). The splitter 10 is dividing the primary pump signal $P_{PUMP}$ into the first and the second pump signal S1, S2 according to said splitting factor. The inventive control method will be explained later.

Figure 2:
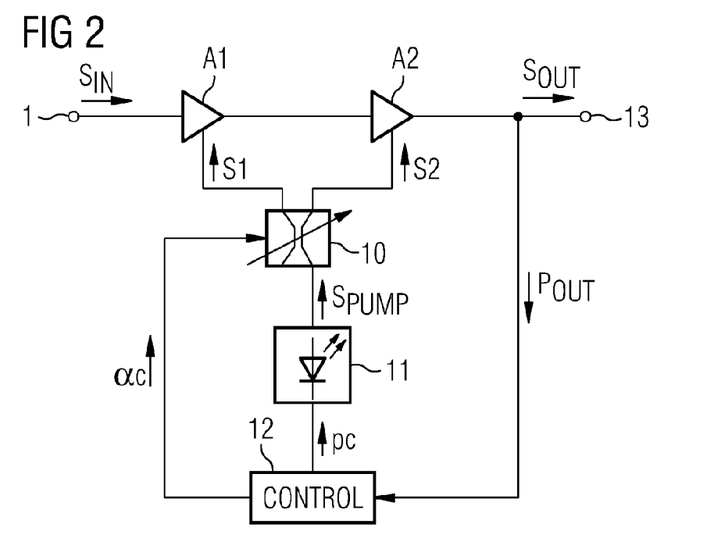
FIG. 2 is a block diagram showing a first embodiment of the invention.

FIG. 2 shows a simplified block diagram of this amplifier arrangement. Monitoring of the input power is not required in most operational modes, e.g. for operation at constant output power. This simplified setup is used for the following explanation of the invention. In this case, the control unit compares the output power $P_{OUT}$ with an internal or external reference value $P_{TAR}$ (TAR—TARGET, FIG. 7).

Figure 3:
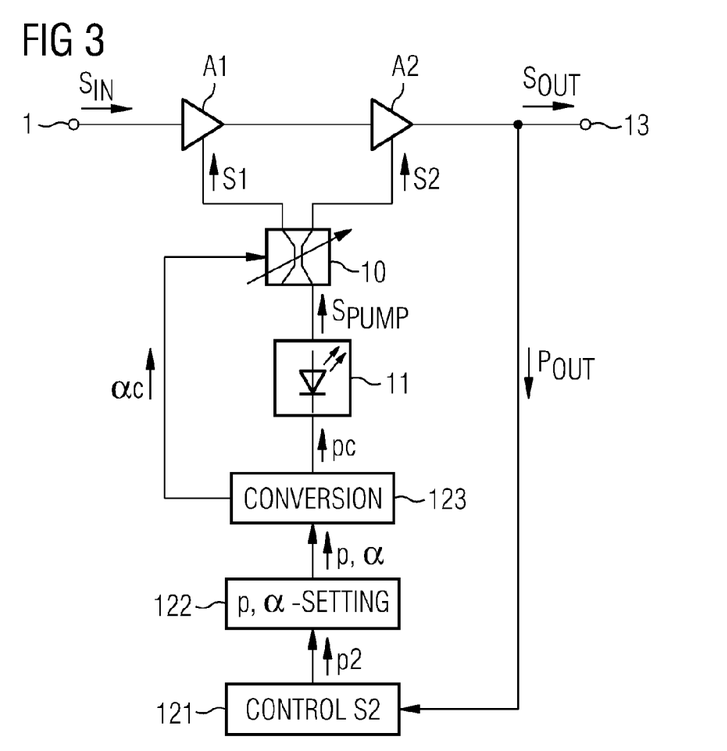
FIG. 3 is a block diagram showing a modified embodiment control circuit.

FIG. 3 shows more details of the control unit. The control unit 12 is split into three functional parts referred to as first control unit 121, second control unit 122 and third control unit 123.

For a better understanding of the invention, it is helpful to have a look at the basic function of a 2-stage amplifier. The last stage of an optical fibre amplifier is usually operated in a saturated regime. Therefore, the output power $P_{OUT}$ is a function of the second pump power P2 (FIG. 5) launched into the second EDF coil 6. Thus, a single corresponding "primary actuating variable" p2 (control variable) is calculated by the first control unit 121, which has the function of a conventional controller and can be realized as analogue or digital circuit (CONTROL S2 indicates, that the first actuating variable p2 is derived to control the second pump signal S2).

The second control unit 122 two secondary actuating variables: The splitting factor $\alpha$ and a corresponding variable p determining the total pump power $P_{PUMP}$ of the primary pump signal $S_{PUMP}$. Both "secondary actuating variables" p and $\alpha$ ($\alpha$ is used for the variable and for the splitting factor) determine the powers of the first and the second pump signal S1, S2 and are fed to the third control unit 123.

The third control unit 123 converts the secondary actuating variables p, $\alpha$ into the physical control signals pc and $\alpha$c.

The described features can be applied with different control methods inclusive by using only feed forward control. In this case, referring to FIG. 1, only the input signal $P_{IN}$ is used to calculate the primary actuating variable.

A flow diagram shown in FIG. 4 may illustrate how the control units work. After a START of the control process, the output power $P_{OUT}$ is measured (in another not shown embodiment the gain or/and the input power is measured). The second step is to compare a reference signal $P_{TAR}$ with the output power $P_{OUT}$ and then, in a third step, according to a comparison result $\Delta p = P_{TAR} - P_{OUT}$, to determine the primary actuating variable p2 controlling the second pump power P2 and therefore the output power $P_{OUT}$ (the same reference signs, e.g. $P_{OUT}$, are used for signals and their derived monitoring signals). The fourth step is to optimize the splitting factor $\alpha$—if not already done—and the total pump power. Therefore the secondary actuating (control) variables p, $\alpha$ are calculated determining the total pump power $P_{PUMP}$ (FIG. 5, FIG. 6) and the splitting factor $\alpha$. The next step is to convert these variables into physical control signals pc and $\alpha$c adjusting the total pump power $P_{PUMP}$ of the pump light source 11 and the splitting factor $\alpha$ of the tuneable splitter 10. This control method is the key part of the invention.

The inventive control method will be explained in detail in conjunction with diagram FIG. 5. A solid line in this diagram shows the relation between the second pump power P2 of the second pump signal S2 and the total pump power $P_{PUMP}$. Both values are standardised. A dashed line shows the relation between the second pump power P2 and the variable splitting factor $\alpha$. The power of the first pump signal P1, injected into the first amplifier stage AS1, can be calculated from the power of the total pump signal $P_{PUMP}$ or the second pump signal S2 and the splitting factor $\alpha$.

To reduce the amplifier noise, most of the total pump power $P_{PUMP}$ should be fed into the first amplifier stage. The largest splitting factor $\alpha_{MAX}$ in the example FIG. 5 is 0.8. In a real amplifier $\alpha_{MAX}$ should be about 0.9 or even more. If the power $P_{OUT}$ of the output signal $S_{OUT}$ is low, most of the total pump energy $P_{PUMP}$, in this example 80%, is injected with a constant largest splitting factor $\alpha_{MAX}$ into the first amplifier stage A1. If the necessary output power $P_{OUT}$ increases, the second pump power P2 of the second pump signal S2 has also to be increased till a maximum total pump energy $P_{PMAX}$ ($P_{PUMP}/P_{PMAX}=1$) is reached. The splitting factor $\alpha_{MAX}$ remains constant and only $P2=P_{PUMP}(1-\alpha_{MAX})=20\%$ of the total pump power are inserted into the second stage; still 80% are inserted into the first stage.

To increase the output power $P_{OUT}$ further, more second pump power P2 has to be injected into the second amplifier stage A2 and therefore less energy into the first amplifier stage: The splitting factor has to be reduced. The splitting factor can go down to a minimum value $\alpha_{MIN}$, in this example 0.2. The maximum total pump power remains constant—horizontal solid line—while the second pump power P2 is increased according $(1-\alpha)$. A maximum power $P2_{MAX}$ is indicated in the diagram on the x-axis at $P2/P_{PMAX}=0.8$. The variation range $\Delta \alpha = \alpha_{MAX} - \alpha_{MIN}$ of the splitting factor is used to vary the output power $P_{OUT}$ when the primary pump signal $P_{PUMP}$ has already reached its maximum power $P_{PMAX}$. This will be shown in FIG. 6. On account of tolerances and the applied control method a maximum total pump power $P_{PUMP}$ should be chosen, which is lesser than the possible maximum total pump power. Then a fast pump power control could be combined with a slower splitting factor optimisation.

Figure 6:
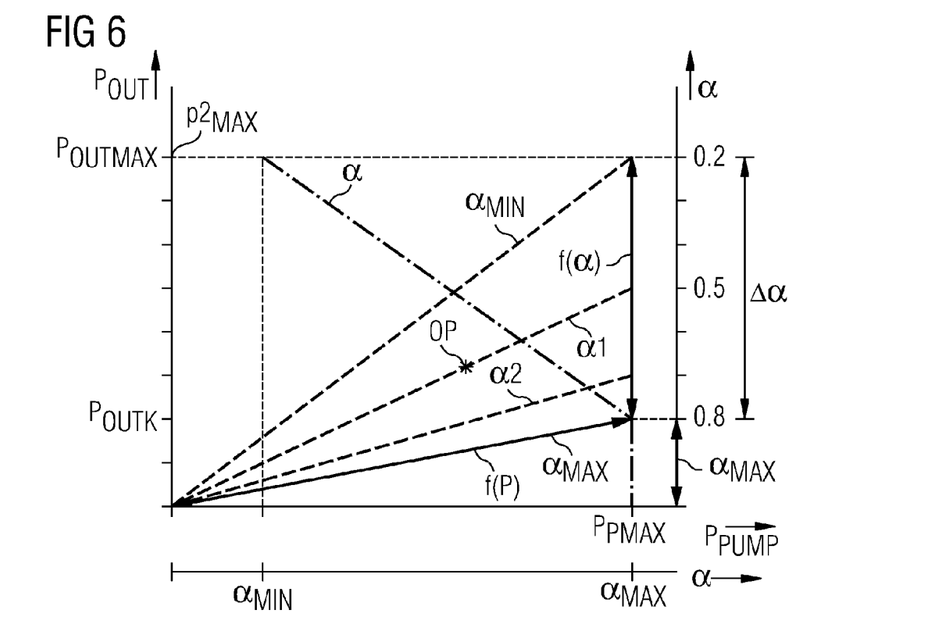
FIG. 6 is a diagram showing the relation between pump power and the splitting factor.

A solid line in Diagram FIG. 6 shows the relation between the total pump power $P_{PUMP}$ respectively the splitting factor $\alpha$ and the output power $P_{OUT}$ of the amplifier. A dash-dotted line shows the relation between the output power $P_{OUT}$ and the splitting factor $\alpha$ marked on the x-axis.

For low output powers $P_{OUT}$ from 0 to $P_{OUTK}$, the splitter is operated with the maximum splitting factor $\alpha_{MAX}=0.8$ according to solid line f(P). For output powers smaller than $P_{OUTK}$ it remains $\alpha_{MAX}$ while the output power increases proportional with the pump power $P_{PUMP}$ till the maximum total pump power $P_{PMAX}$ and the associated output power $P_{OUTK}$ are reached.

When the maximum total pump power $P_{PMAX}$ is reached, and the output power still has to be increased, then the splitting factor $\alpha$ has to be reduced. The vertical characteristic line $f(\alpha)$ shows the output power $P_{OUT}$ as a function of the splitting factor $\alpha$ while the total pump power $P_{PMAX}$ remains constant. The splitting factor is additional marked on the vertical axis on the right side of the diagram. The output power $P_{OUT}$ is approximately proportional to the second pump power P2 of the second pump signal S2 and increases according to $P_{PMAX}(1-\alpha)$ up to $P_{OUTMAX}$, when the splitting factor reaches its minimum value $\alpha_{MIN}$ and the second pump power P2 also reaches its maximum value $P2_{MAX}$. According to the invention only the solid lines are used for operating the amplifier. The dashed lines show only the relations for other fixed splitting parameters $\alpha_1, \alpha_2, \alpha_{MIN}$.

Starting the control process, it should be ensured that the system is operated along these characteristic solid lines. By sudden changes of the input signal and due to control preferences a not optimal operating point OP could be reached, with $P_{PUMP} < P_{MAX}$ and $\alpha < \alpha_{MAX}$. Then the solid lines can be achieved by increasing $\alpha$ and $P_{PUMP}$.

Figure 7:
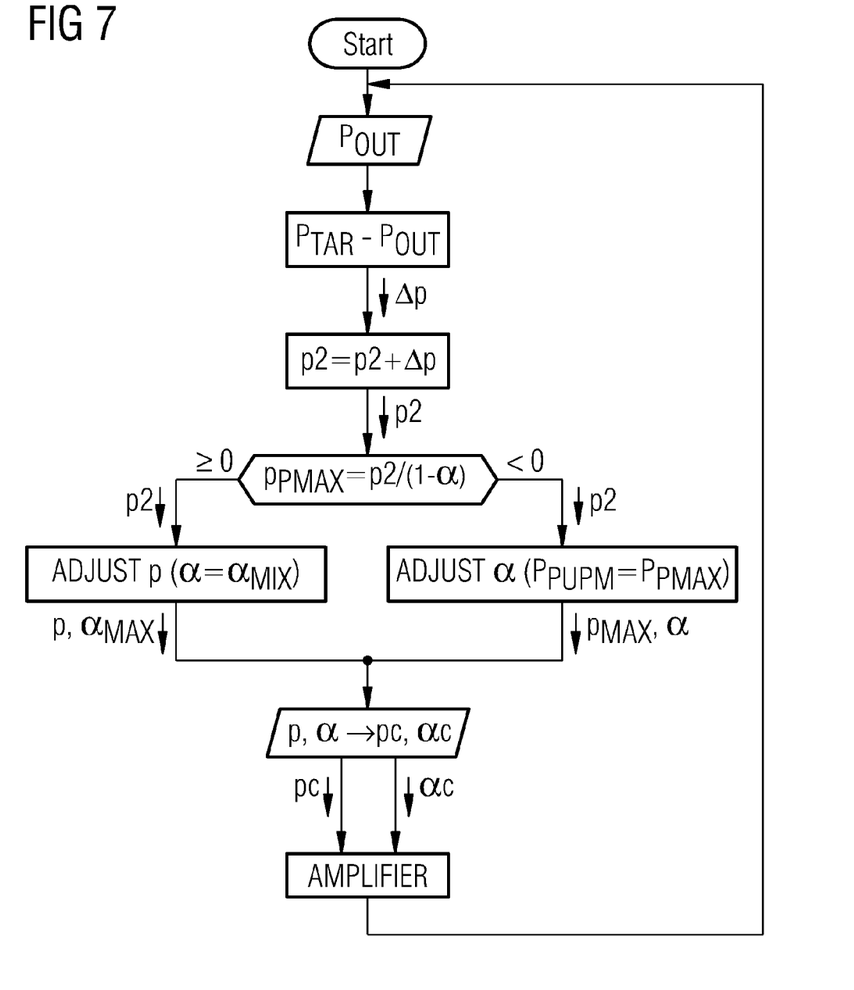
FIG. 7 is a diagram showing the control performance between output power and pump power.

A still simplified flow diagram FIG. 7 shows the method steps in a more detailed way for normal operation. Beside this flow diagram other flow diagrams lead to the same result. As already known from the flow diagram FIG. 4 the output power $P_{OUT}$ is measured in a first step after START or derived from other signals and in a second step compared with a reference value $P_{TAR}$.

The result $\Delta p$ is fed to a controller. In a basic configuration, it is added to a former actuating variable and results in a new actuating variable p2 determining the second pump power P2. Then it is checked if the total pump power equals the maximum total available pump power $P_{PMAX}$. According to the result the pump signal or the splitting factor is adjusted.

A more enhanced embodiment of the invention uses a superior method for calculating the actuating variable p2 and also calculated values to determine the secondary variables. E.g. a total pump power reference value $p_{PMAX}$ is compared with a calculated pump power value $p2/(1-\alpha_{MAX})$ (corresponds to comparing $P_{PMAX}$ with $P2/(1-\alpha_{MAX})$, which will be used in the following description).

If the calculated maximum total pump power $P2/(1-\alpha_{MAX})$ is smaller than the maximum pump power $P_{PMAX}$, changes of the actuating variable p2 (the second pump power P2) lead to variation of the emitted pump power $P_{PUMP}$ only, whereas the splitting factor is kept constant $\alpha_{MAX}$.

If the (calculated) total pump power $P2/(1-\alpha_{MAX})$ is higher than the maximum pump power $P_{PMAX}$ (respectively the corresponding values $p2/(1-\alpha_{MAX})$, $p_{PMAX}$), then the splitting factor $\alpha$ is adjusted while the total pump power $P_{PMAX}$ remains at its maximum value. Only one pair of the secondary actuating variables p, $\alpha_{MAX}$ or $p_{MAX}$, $\alpha$ is fed to the conversion "unit", converted into control signals pc, αc and fed to amplifier.

In other words, the enhanced embodiment adjusts the total pump power $P_{PUMP}$ of the primary pump signal $S_{PUMP}$ according to the first actuating variable p2 while maintaining a maximum splitting factor $\alpha_{MAX}$ if the available maximum total pump power $P_{PMAX}$ of the primary pump signal $S_{PUMP}$ is sufficient to set a targeted operating point on the characteristic line f(P2), and adjusts the splitting factor $\alpha$ of the tuneable splitter 10 according to said first actuating variable p2 if the available maximum total pump power $P_{PMAX}$ of the primary pump signal $S_{PUMP}$ is not sufficient to set the targeted operating point on the characteristic line f(P2). In this case the targeted operating point lies on the characteristic line f($\alpha$).

Figure 8:
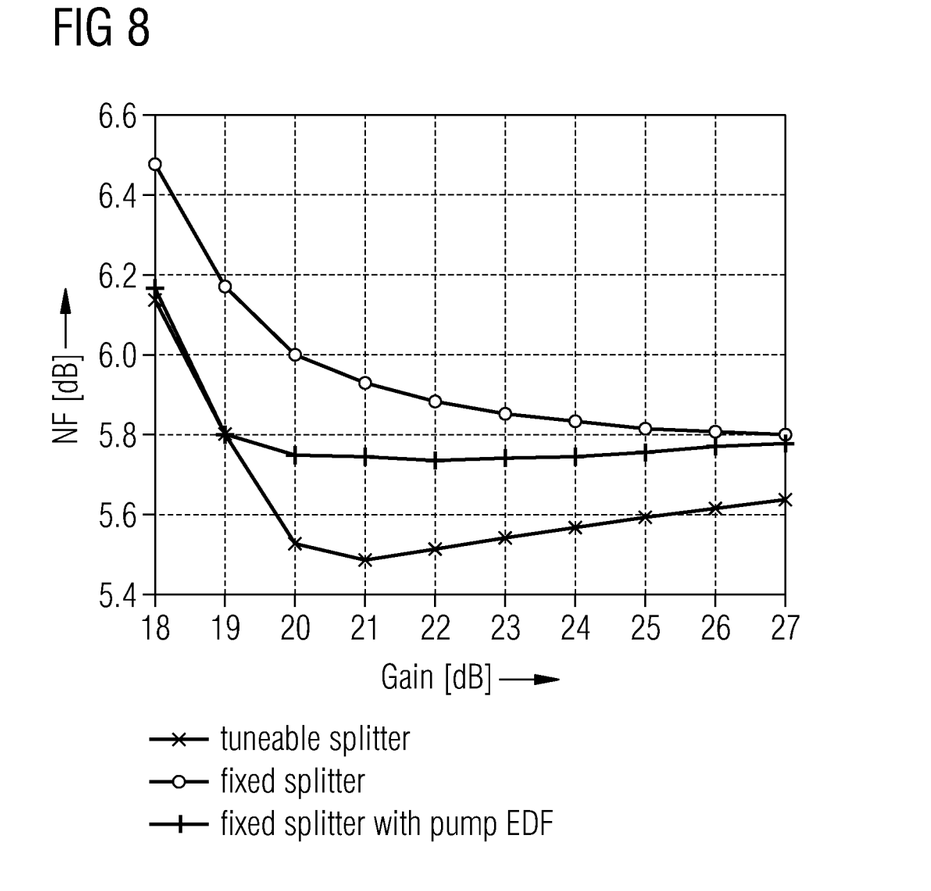
FIG. 8 is a diagram showing the noise figure NF of a typical optical amplifier and the amplifier according to the invention.

FIG. 8 shows the typical noise figure NF of the setup according to the invention compared with prior art amplifiers. Of course, each configuration can be designed to achieve the same optimum noise performance for a certain gain value. But in this case, the performance of prior art setups will degrade more severely for other operating points.

Serving as an example, for a given set of amplifier requirements (gain range, pump power level, output power levels), an improvement up to about 0.5 dB of the noise figure at low channel count is reported for the inventive setup with respect to the common architectures based on standard prior art, and about 0.25 dB compared to the design comprising an EDF in the pump line. In addition, the variation of the maximum output power is much higher when the inventive setup is applied.

In order to provide a broad overview over the improvement, the whole operating range of the amplifier has to be considered with respect to the achievable noise figure. At low gain values, the Noise Figure reduction can be higher than 0.5 dB depending on the value of output power and decreases by increasing the gain. The improvement is of about 0.2 dB for gain levels exceeding 20 dB.

Figure 9:
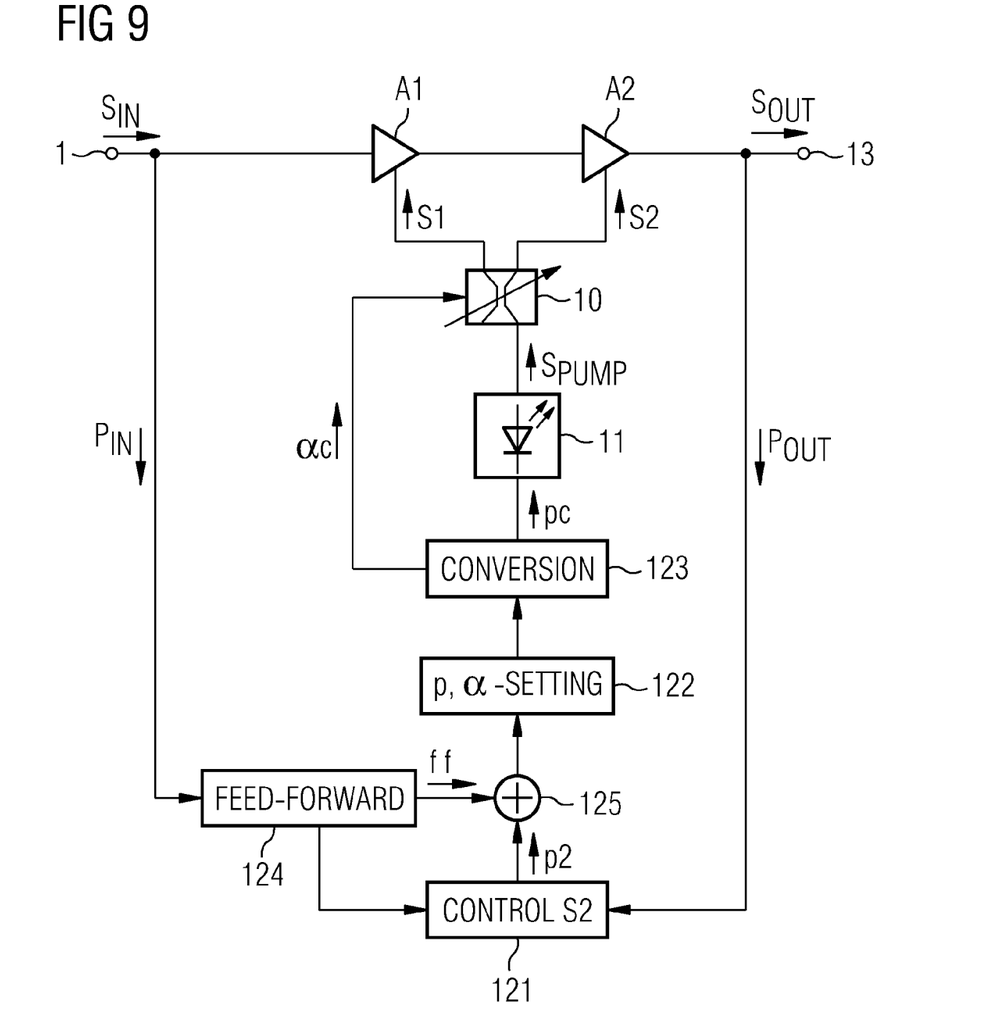
FIG. 9 is a diagram showing an embodiment of the invention with feed-forward control.

FIG. 9 shows a further embodiment of the invention with an additional feed-forward component to face transient events at the amplifier input. A feed forward control signal ff is derived by a feed-forward unit 124, fed to an adder 125 (or multiplier) and combined with the ongoing actuating variable p2.

REFERENCE SIGNS 1 amplifier input
2 first splitter
3 coupler
4 EDF—Erbium Doped Fiber
5 second coupler
6 second EDF
7 second splitter
8 first opto-electrical converter
9 second opto-electrical converter
10 tuneable/variable splitter
11 pump light source/laser
12 control unit
$S_{IN}$ input signal
A1 first amplifier stage
A2 second amplifier stage
EDF erbium doped fiber
I1-I3 isolator
$S_{OUT}$ output signal
$P_{OUT}$ output power
$S_{PUMP}$ primary pump signal
S1 first pump signal
S2 second pump signal
$\alpha$ splitting factor
pc electrical $P_{PUMP}$ control signal
αc electrical $\alpha$ control signal
121 first control block
122 second control block
123 third control block
p2 first actuating variable determining P2
p secondary actuating variable determining $P_{PUMP}$
$\alpha$ secondary actuating variable determining the splitting factor
$P_{PUMP}$ total pump power (of the primary pump light source)
$P_{PMAX}$ maximum total pump power
$\alpha_{MAX}$ maximum splitting factor
$\alpha_{MIN}$ minimum splitting factor
P2 second pump power (of S2)
$\Delta\alpha$ variation range of $\alpha$
$P_{OUTK}$ maximum $P_{OUT}$ for $\alpha_{MAX}$
$P_{OUTMAX}$ maximum output power of $S_{OUT}$
$P2_{MAX}$ maximum second pump power
f(P) characteristic line for $\alpha=\alpha_{MAX}$
f($\alpha$) characteristic line for $P_{PUMP}=P_{PMAX}$
$\alpha_1$, $\alpha_2$ fixed splitting factor
OP operating point
$p_{PMAX}$ maximum total pump power reference value
$p_{MAX}$ maximum secondary actuating variable p
$p2(1-\alpha)$ calculated total pump power value
NF noise figure
124 feed-forward unit
ff feed-forward component

The invention claimed is:

1. A method for controlling an optical fiber amplifier with a first amplifier stage and a second amplifier stage, pumped by a single pump light source generating a primary pump signal, the method which comprises:
   splitting the primary pump signal in a tunable splitter into a first pump signal and a second pump signal according to a splitting factor, for pumping the first amplifier stage and the second amplifier stage, respectively;
   determining a primary actuating variable for controlling a second pump power of the second pump signal and therefore an output power of the amplifier;
   adjusting a total pump power of the primary pump signal according to the primary actuating variable while maintaining a maximum splitting factor if the total pump power of the primary pump signal is less than an available maximum total pump power of the primary pump signal; and
   adjusting the splitting factor of the tuneable splitter according to the primary actuating variable if the total pump power equals the maximum total pump power of the primary pump signal.

2. The method according to claim 1, which comprises:
   calculating secondary actuating variables according to the primary actuating variable determining the pump power of the primary pump signal and the splitting factor;

converting the secondary actuating variables into electrical control signals; and
adjusting the total pump power of the pump light source and the splitting factor of the tuneable splitter according to the electrical control signals.

3. The method according to claim 1, which comprises:
determining the output power of the amplifier output signal;
comparing a reference value with the output power; and
generating the primary actuating variable according to a difference between the reference value and the output power.

4. The method according to claim 2, which comprises:
comparing the maximum pump power with the current pump power; or
comparing a total pump power reference value with a calculated total pump power value; and
generating the secondary actuation variables according to a comparison result of the pump power reference value and the calculated pump power reference value.

5. The method according to claim 4, which comprises combining a forward control component, derived from an input signal, with the primary actuating variable determining the output power of the output signal.

6. The method according to claim 1, which comprises:
checking whether or not the total pump power is less than the maximum pump power and the splitting factor is less than the maximum splitting factor; and
if both conditions are fulfilled, increasing the total pump power and the splitting factor until a characteristic control line is obtained.

7. An optical amplifier, comprising:
a single pump light source for generating a primary pump signal;
a tuneable splitter having a variable splitting factor for dividing the primary pump signal into a first pump signal and a second pump signal;
a first amplifier stage and a second amplifier stage connected to receive the first pump signal and the second pump signal, respectively; and
a control unit for monitoring an output power of the amplifier and for controlling the primary pump signal, said control unit being configured to:
determine a primary actuating variable for controlling a second pump power of the second pump signal and therefore the output power of the amplifier;
adjust a total pump power of the primary pump signal according to the primary actuating variable while maintaining a maximum splitting factor if a total pump power of the primary pump signal is less than a maximum total pump power of the primary pump signal; and
adjust the splitting factor of said tuneable splitter according to the primary actuating variable if the total pump power equals the maximum total pump power of the primary pump signal.

8. The optical amplifier according to claim 7, wherein said control unit is configured for:
calculating secondary actuating variables according to the primary actuating variable determining the pump power of the primary pump signal and the splitting factor;
converting the secondary actuating variables into electrical control signals; and
adjusting the total pump power of said pump light source and the splitting factor of said tuneable splitter according to the electrical control signals.

9. The optical amplifier according to claim 7, wherein said control unit is configured for:
determining the output power of the amplifier;
comparing a reference value with the output power; and
generating the primary actuating variable according to a difference of the reference value and the output power.

10. The optical amplifier according to claim 7, wherein said control unit is configured for:
comparing the maximum pump power with the pump power; or
comparing a total pump power reference value with a calculated total pump power value; and
generating the secondary actuation variables according to a result of the respective comparing step.

11. The optical amplifier according to claim 7, which comprises a feed forward unit connected to the amplifier input via a first splitter and a first optical-electrical converter monitoring an input signal and generating a feed-forward component from a power variation of an input signal and feeding the feed-forward component to said control unit.

12. The optical amplifier according to claim 7, wherein passive parts of the amplifier are integrated on a Planar Lightwave Circuit chip.

* * * * *